US009588471B2

(12) United States Patent
Matsumoto et al.

(10) Patent No.: US 9,588,471 B2
(45) Date of Patent: Mar. 7, 2017

(54) MEMBER FOR ELECTROPHOTOGRAPHY, IMAGE HEATING APPARATUS, IMAGE FORMING APPARATUS, AND METHOD FOR MANUFACTURING MEMBER FOR ELECTROPHOTOGRAPHY

(71) Applicant: CANON KABUSHIKI KAISHA, Tokyo (JP)

(72) Inventors: Mamo Matsumoto, Hiratsuka (JP); Yoshihito Oshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/963,554

(22) Filed: Dec. 9, 2015

(65) Prior Publication Data
US 2016/0091841 A1    Mar. 31, 2016

Related U.S. Application Data

(63) Continuation of application No. PCT/JP2015/004539, filed on Sep. 8, 2015.

(30) Foreign Application Priority Data

Sep. 30, 2014 (JP) ................................. 2014-201851
Aug. 31, 2015 (JP) ................................. 2015-171171

(51) Int. Cl.
*G03G 15/20* (2006.01)
*B32B 25/20* (2006.01)
(Continued)

(52) U.S. Cl.
CPC ............. *G03G 15/206* (2013.01); *B32B 7/06* (2013.01); *B32B 15/06* (2013.01); *B32B 15/08* (2013.01);
(Continued)

(58) Field of Classification Search
CPC ................................. G32B 25/20; G32B 25/16
See application file for complete search history.

(56) References Cited

U.S. PATENT DOCUMENTS 9,037,062 B2    5/2015   Matsumoto et al.
9,164,450 B2    10/2015  Matsumoto et al.
(Continued)

FOREIGN PATENT DOCUMENTS

JP    2000-267487 A    9/2000
JP    2001-324888 A    11/2001
(Continued)

OTHER PUBLICATIONS

International Search Report in International Application No. PCT/JP2015/004539 (pub. Apr. 7, 2016).

*Primary Examiner* — Joshua D Zimmerman
(74) *Attorney, Agent, or Firm* — Fitzpatrick, Cella, Harper & Scinto (57) ABSTRACT

Provided is a member for electrophotography, where an elastic layer including a silicone rubber and a release layer including a fluorine resin are bonded sufficiently without any adhesive layer interposed therebetween. The member for electrophotography includes a substrate; an elastic layer including a silicone rubber, on the substrate; and a release layer provided in direct contact with the surface of the elastic layer, where the release layer includes a fluorine resin selected from the group consisting of PFA, FEP, PTFE, ETFE, PCTFE, ECTFE, and PVDF, and the elastic layer undergoes a cohesive failure when the release layer is peeled from the elastic layer in accordance with "Determination of peel strength of bonded assemblies. Part 1: 90 degree peel" specified by the Japanese Industrial Standards (JIS) K 6854-1:1999.

14 Claims, 6 Drawing Sheets

(51) Int. Cl.
  *B32B 25/08* (2006.01)
  *B32B 27/32* (2006.01)
  *B32B 27/08* (2006.01)
  *B32B 7/06* (2006.01)
  *B32B 37/06* (2006.01)
  *B32B 15/06* (2006.01)
  *B32B 15/08* (2006.01)
  *B32B 27/18* (2006.01)
  *B32B 27/28* (2006.01)
  *B32B 27/30* (2006.01)
  *B32B 27/34* (2006.01)
  *B32B 37/26* (2006.01)

(52) U.S. Cl.
  CPC .............. *B32B 25/08* (2013.01); *B32B 25/20* (2013.01); *B32B 27/08* (2013.01); *B32B 27/18* (2013.01); *B32B 27/281* (2013.01); *B32B 27/304* (2013.01); *B32B 27/322* (2013.01); *B32B 27/34* (2013.01); *B32B 37/06* (2013.01); *G03G 15/2057* (2013.01); *B32B 2037/268* (2013.01); *B32B 2262/106* (2013.01); *B32B 2264/102* (2013.01); *B32B 2307/202* (2013.01); *B32B 2307/50* (2013.01); *B32B 2307/51* (2013.01); *B32B 2307/54* (2013.01); *B32B 2307/748* (2013.01); *B32B 2310/0831* (2013.01); *B32B 2327/18* (2013.01); *B32B 2457/00* (2013.01); *B32B 2559/00* (2013.01)

(56) References Cited

U.S. PATENT DOCUMENTS

2014/0227526 A1* 8/2014 Egawa ................. G03G 15/162
    428/411.1
2015/0277303 A1 10/2015 Oshima et al.
2015/0355581 A1* 12/2015 Matsunaka .......... B05D 3/0272
    399/333

FOREIGN PATENT DOCUMENTS

| JP | 2005-084294 A | 3/2005 |
| JP | 2005-238765 A | 9/2005 |
| JP | 2005-301254 A | 10/2005 |
| JP | 2013-061383 A | 4/2013 |

* cited by examiner

MEMBER FOR ELECTROPHOTOGRAPHY, IMAGE HEATING APPARATUS, IMAGE FORMING APPARATUS, AND METHOD FOR MANUFACTURING MEMBER FOR ELECTROPHOTOGRAPHY

CROSS-REFERENCE TO RELATED APPLICATIONS

This application is a continuation of International Application No. PCT/JP2015/004539, filed Sep. 8, 2015, which claims the benefit of Japanese Patent Application No. 2014-201851, filed Sep. 30, 2014, and Japanese Patent Application No. 2015-171171, filed Aug. 31, 2015.

BACKGROUND OF THE INVENTION

Field of the Invention

The present invention relates to a member for electrophotography, which is preferably used as a fixing member of an electrophotographic image forming apparatus (hereinafter, also referred to as an "image forming apparatus") such as a copying machine and a printer, an image heating apparatus, an image forming apparatus, and a method for manufacturing the member for electrophotography.

Description of the Related Art

Fixing members for use in image heating apparatuses in image forming apparatuses such as copying machines, printers, and facsimile machines are typically members each including at least elastic layer and a release layer including a fluorine resin on a heat-resistant substrate. Elastic layers composed of silicone rubbers, which have a surface coated with fluorine resin tubes subjected to extrusion molding, are mainly used as the fixing members.

However, the fluorine resins which originally have high releasability are less likely to be bonded to the surfaces of the elastic layers of silicone rubbers, and it is difficult to achieve sufficient adhesion between the elastic layers and the release layers.

Therefore, in general, an adhesive layer is provided between elastic layers of silicone rubber and a release layer, and the adhesive layer bonds the both layers. In Japanese Patent Application Laid-Open No. 2005-238765, an addition-curable silicone rubber adhesive in the form of a liquid or a paste is interposed to bond an elastic layer of silicone rubber and a release layer.

SUMMARY OF THE INVENTION

In recent years, in order to respond to the needs of increased printing speeds and energy saving for image forming apparatuses, efforts have been made to further improve thermal conductive properties of fixing members.

In particular, as fixing members, release layers including fluorine resins are preferably thin in order to smoothly transfer heat to toners. However, the release layers are likely to suffer from abrasion due to rubbing against recording media (for example, paper), and thus required to have a certain layer thickness, and there are limitations to the reduction in layer thickness for the release layer. In addition, the reduction in layer thickness for the elastic layer decreases the heat storage property and flexibility of the elastic layers, and there is thus a possibility of degrading the fixing performance of the fixing members.

On the other hand, the adhesive layer between the elastic layer and release layer of the fixing member is provided to bond the both layers. Accordingly, as long as the both are bonded sufficiently without any adhesive layer, the fixing member can be considered excellent in terms of thermal conductivity and advantageous for fixability, when the fixing member has no adhesive layer.

Therefore, the present invention is directed to providing a member for electrophotography with excellent thermal conductivity, where an elastic layer and a release layer including a fluorine resin are bonded sufficiently without any adhesive layer interposed therebetween, and a method for manufacturing the member. In addition, the present invention is also directed to providing an image heating apparatus and an image forming apparatus that have excellent thermal conductivity.

According to one aspect of the present invention, there is provided a member for electrophotography, including: a substrate; an elastic layer including a silicone rubber, provided on the substrate; and a release layer including a fluorine resin, provided in direct contact with a surface of the elastic layer, wherein the release layer includes at least one fluorine resin selected from the group consisting of a tetrafluoroetylene-perfluoro(alkylvinylether) copolymer (PFA), a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVDF), and the elastic layer undergoes a cohesive failure when the release layer is peeled from the elastic layer in accordance with "Determination of peel strength of bonded assemblies. Part 1: 90 degree peel" specified by the Japanese Industrial Standards (JIS) K 6854-1:1999.

Further, according to another aspect of the present invention, there is provided: an image heating apparatus including a fixing member and a heating member, where the fixing member is the member for electrophotography as described above; and an image forming apparatus including the image heating apparatus.

Furthermore, according to another aspect of the present invention, there is provided a method for manufacturing the member for electrophotography, wherein the method includes the steps of: forming an elastic layer including a silicone rubber on a substrate; laminating a release layer including a fluorine resin selected from the group consisting of a tetrafluoroethylene-perfluoroalkylvinylether copolymer (PFA), a tetrafluoroethylene-hexafluoropropylene copolymer (FEP), a polytetrafluoroethylene (PTFE), an ethylene-tetrafluoroethylene copolymer (ETFE), a polychlorotrifluoroethylene (PCTFE), an ethylene-chlorotrifluoroethylene copolymer (ECTFE), and a polyvinylidene fluoride (PVDF), to be brought into direct contact with the surface of the elastic layer; and bonding the elastic layer and the release layer, by irradiating the surface of contact between the elastic layer and the release layer with ultraviolet light.

According to the present invention, a member for electrophotography with an excellent thermal conductive property can be achieved where the elastic layer including the silicone rubber and the release layer including the fluorine resin bonded sufficiently without any adhesive layer interposed therebetween. In addition, the use of the member for electrophotography as a fixing member can achieve an image heating apparatus and an image forming apparatus which have excellent thermal conductivity. Furthermore, the method for manufacturing a member for electrophotography according to the present invention makes it possible to achieve adhesion between the elastic layer including the silicone rubber and the release layer including the fluorine resin without any adhesive layer interposed therebetween.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The inventor has found that, as a result of a great deal of studies made in order to overcome the above-mentioned problems, according to the present invention, even when a release layer is used which includes a highly releasable fluorine resin, the release layer and an elastic layer can be sufficiently bonded to each other without any adhesive layer interposed therebetween.

More specifically, the present invention provides a member for electrophotography, including: a substrate; an elastic layer including a silicone rubber, provided on the substrate; and a release layer including a fluorine resin, provided in direct contact with a surface of the elastic layer, wherein the release layer includes at least one fluorine resin selected from the group consisting of a tetrafluoroetylene-perfluoro (alkylvinylether) copolymer (PFA), a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVDF), and the elastic layer undergoes a cohesive failure when the release layer is peeled from the elastic layer in accordance with "Determination of peel strength of bonded assemblies. Part 1: 90 degree peel" specified by the Japanese Industrial Standards (JIS) K 6854-1:1999.

In addition, the present invention provides a method for manufacturing the member for electrophotography, wherein the method includes the steps of: forming an elastic layer including a silicone rubber on a substrate; laminating a release layer including a fluorine resin selected from the group consisting of a tetrafluoroethylene-perfluoroalkylvinylether copolymer (PFA), a tetrafluoroethylene-hexafluoropropylene copolymer (FEP), a polytetrafluoroethylene (PTFE), an ethylene-tetrafluoroethylene copolymer (ETFE), a polychlorotrifluoroethylene (PCTFE), an ethylene-chlorotrifluoroethylene copolymer (ECTFE), and a polyvinylidene fluoride (PVDF), to be brought into direct contact with the surface of the elastic layer; and bonding the elastic layer and the release layer, by irradiating the surface of contact between the elastic layer and the release layer with ultraviolet light.

The reason that the member for electrophotography achieves sufficient adhesion between the release layer and the elastic layer is considered by the inventor to be that the release layer including the fluorine resin is likely to transmit ultraviolet light, thereby causing ultraviolet light to efficiently reach the surface of contact between the elastic layer including the silicone rubber and the release layer. When ultraviolet light is absorbed at the surface of the elastic layer including the silicone rubber, Si—C bonds and C—H bonds derived from the silicone rubber are believed to be broken to generate active species such as methyl radicals and hydroxyl radicals. These active species are believed to draw out fluorine atoms in the fluorine resin in contact with the silicon rubber, and bond the silicone rubber directly to the fluorine resin. As a result, the fluorine resin and the elastic layer are believed to be bonded.

The member for electrophotography according to the present invention can be used as a fixing member (a fixing roller, a fixing film), a pressure member (a pressure roller), or a roller for conveyance in an image heating apparatus. Above all, the member is preferably used as a fixing member.

While a fixing member will be taken as an example of the member for electrophotography according to the present invention and described in detail below, the present invention is not to be limited to the fixing member.

(1) Fixing Member

Figure 1:
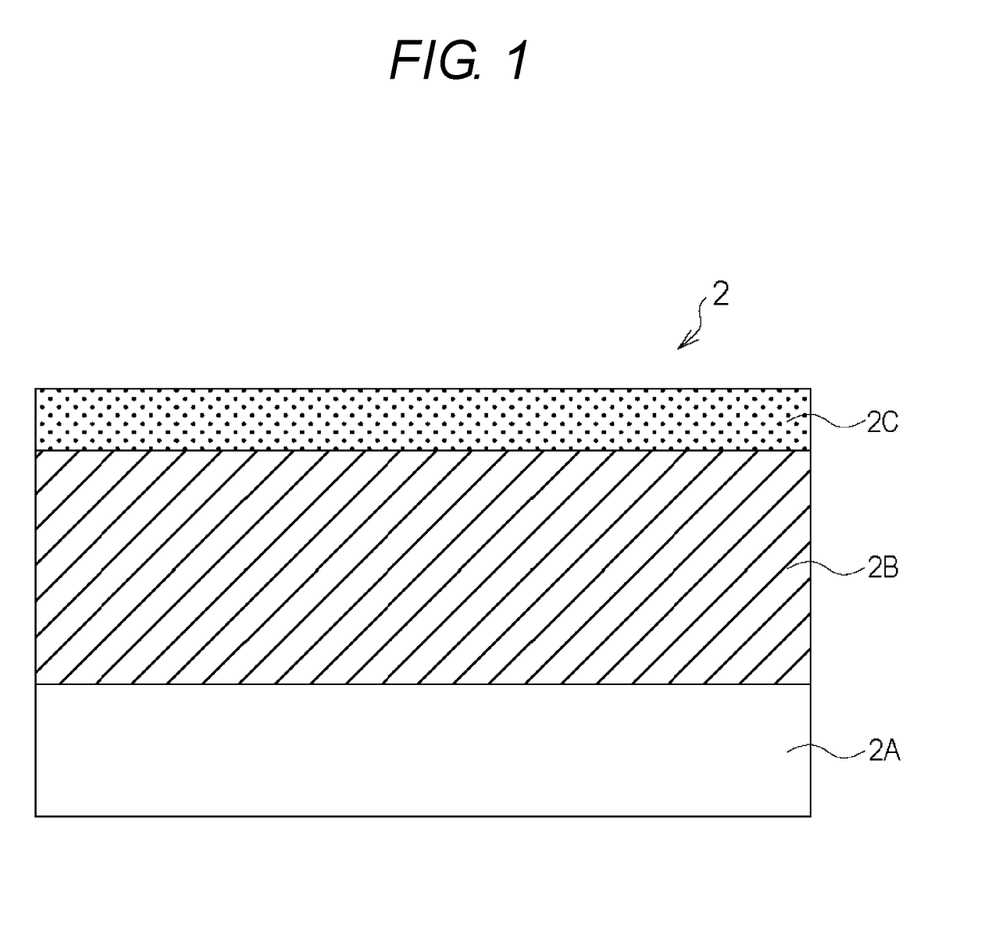
FIG. 1 is a schematic cross-sectional view illustrating the layer configuration of a fixing film that is an example of a member for electrophotography according to the present invention.

FIG. 1 is a schematic cross-sectional view illustrating the layer configuration of a fixing film 2 as an example of a member for electrophotography according to the present invention. In addition, FIG. 2B is a cross-sectional schematic diagram illustrating an example of the configuration of an image heating apparatus according to the present invention.

The fixing film 2 is an endless belt member composed of a substrate 2A, an elastic layer 2B formed on an outer peripheral surface of the substrate 2A, and a release layer 2C including a fluorine resin, which is provided with the elastic layer 2B and the release layer 2C in direct contact with each other. In this regard, in FIG. 1, the upper side corresponds to the outer peripheral surface of the fixing film 2, whereas the lower side corresponds to the inner peripheral surface of the fixing film 2.

It is to be noted that the layer configuration of the fixing member is not to be limited to the present embodiment, as long as the layer configuration has the elastic layer 2B and the release layer 2C in direct contact with each other. Specifically, another layer may be provided on the outside of the release layer 2C, another layer (an adhesive layer or a primer layer) may be provided between the substrate 2A and the elastic layer 2B, and the elastic layer may be configured to have multiple layers.

In addition, the form of the fixing member is not to be considered limited to the form of a belt as described below, but the present invention is also applicable to a fixing member in the form of a roller.

(2) Substrate

Metals such as SUS, nickel, and nickel alloys, and thermosetting resins such as polyimide and polyamideimide can be used as the substrate 2A.

The substrate 2A is preferably 20 μm or more and 100 μm or less in thickness. When the substrate 2A is 100 μm or less in thickness, the fixing film 2 undergoes a decrease in heat capacity, which is thus advantageous for quickly starting an image heating apparatus 114. In addition, when the substrate 2A is 20 μm or more in thickness, the fixing film 2 has sufficient strength.

(3) Elastic Layer

A heat-resistant silicone rubber mixed with a highly thermal conductive filler can be used as a material for the elastic layer 2B. As the silicone rubber, an addition-curable silicone rubber is preferably used from the perspective of workability.

The elastic layer 2B is preferably 50 μm or more and 1 mm or less, more preferably 80 μm or more and 300 μm or less in layer thickness. The elastic layer 2B has a role to transfer heat from a heater 3, to a recording medium P and an unfixed toner image T, in a way that follows and wrap around convexes and depressions of the recording medium P and the unfixed toner image T. When the elastic layer 2B is 1 mm or less in layer thickness, the heat from the heater 3 can be efficiently transferred to the recording medium P, which is thus advantageous for quickly starting the image heating apparatus 114. In addition, when the elastic layer 2B is 50 μm or more in layer thickness, the fixing member can favorably follow the convexes and depressions of the unfixed toner image T.

(3-1) Silicone Rubber

The raw material for the addition-curable silicone rubber (hereinafter, also referred to as an "addition-curable silicone rubber composition") forming the elastic layer 2B includes:
(a) an organopolysiloxane having an unsaturated aliphatic group;
(b) an organopolysiloxane having active hydrogen bonded to silicon; and
(c) a platinum compound as a cross-linking catalyst.

Examples of the (a) organopolysiloxane having an unsaturated aliphatic group include the following:

a straight-chain organopolysiloxane with both molecular ends represented by $R1_2R2SiO_{1/2}$ and intermediate units represented by $R1_2SiO$ and $R1R2SiO$ a branched organopolysiloxane with both molecular ends represented by $R1_2R2SiO_{1/2}$, and $R1SiO_{3/2}$ and/or $SiO_{4/2}$ contained as intermediate units.

In this regard, R1 represents a monovalent unsubstituted or substituted hydrocarbon group containing no unsaturated aliphatic group, which is bonded to a silicon atom. Specific examples thereof include alkyl groups (for example, a methyl group, an ethyl group, an n-propyl group, an n-butyl group, an n-pentyl group, an n-hexyl group), aryl groups (a phenyl group, a naphthyl group), and substituted hydrocarbon groups (for example, a chloromethyl group, a 3-chloropropyl group, a 3,3,3-trifluoropropyl group, a 3-cyanopropyl group, a 3-methoxypropyl group).

In particular, in view of ease of synthesis and handling, and excellent heat resistance achieved, methyl groups preferably account for 50% or more of R1, more preferably, all of R1.

In addition, R2 represents an unsaturated aliphatic group bonded to a silicon atom. Examples of R2 include a vinyl group, an aryl group, a 3-butenyl group, a 4-pentenyl group, and a 5-hexenyl group, and in particular, a vinyl group is preferred, because synthesis and handling are easy and cross-linking reaction of the silicone rubber is easily carried out.

The (b) organopolysiloxane having active hydrogen bonded to silicon is a cross-linking agent that forms a cross-linked structure through a reaction with an alkenyl group of the (a) organopolysiloxane constituent having an unsaturated aliphatic group by the catalytic action of the platinum compound. In the (b) organopolysiloxane having active hydrogen bonded to silicon, the number of hydrogen atoms bonded to the silicon atom is preferably greater than 3 on average in one molecule. Examples of the organic group bonded to the silicon atom include unsubstituted or substituted monovalent hydrocarbon groups equivalent to R1 of the organopolysiloxane constituent having an unsaturated aliphatic group. In particular, a methyl group is preferred in view of ease of synthesis and handling. The molecular weight of the (b) organopolysiloxane having active hydrogen bonded to silicon is not particularly limited.

The kinetic viscosity of the (b) organopolysiloxane having active hydrogen bonded to silicon at 25° C. preferably falls within the range of 10 mm$^2$/s or more and 100,000 mm$^2$/s or less, further preferably 15 mm$^2$/s or more and 1,000 mm$^2$/s or less. When the kinetic viscosity is 10 mm$^2$/s or more, the organopolysiloxane is less likely to volatilize during storage, a desired degree of cross-linkage and properties are obtained in a yielded silicone rubber. In addition, when the kinetic viscosity is 100,000 mm$^2$/s or less, the organopolysiloxane is easy to handle, can be easily homogeneously-dispersed in the system.

The siloxane skeleton of the (b) organopolysiloxane having active hydrogen bonded to silicon may be acceptably any of straight-chain, branched, and cyclic skeletons, and mixtures thereof may be used. In particular, from the perspective of ease of synthesis, the straight-chain skeletons are preferred. In the (b) organopolysiloxane having active hydrogen bonded to silicon, the Si—H bond may present in every siloxane unit in the molecules, while at least some of the bonds are preferably present at ends of the organopolysiloxane molecules, like the $R1_2HSiO_{1/2}$ unit.

The (a) organopolysiloxane having an unsaturated aliphatic group and (b) organopolysiloxane having active hydrogen bonded to silicon are preferably included so that the ratio of the number of unsaturated aliphatic groups to the number of silicon atoms is 0.001 or more and 0.020 or less, more preferably 0.002 or more and 0.010 or less in the addition-curable silicone rubber composition. In addition, the organopolysiloxanes are preferably included so that the ratio of the active hydrogen number with respect to the number of unsaturated aliphatic group is 0.3 or more and 0.8 or less. When the ratio of active hydrogen number to the number of unsaturated aliphatic groups is 0.3 or more, desired hardness can be achieved stably in the cured silicone rubber. In addition, when the ratio of active hydrogen number to the number of unsaturated aliphatic groups is 0.8 or less, the hardness of the silicone rubber is kept from being excessively increased. The ratio of the active hydrogen number with respect to the number of unsaturated aliphatic group can be calculated by determining the number of unsaturated aliphatic groups and the active hydrogen number through the measurement with the use of hydrogen-nuclear magnetic resonance analysis (1H-NMR (Trade Name: AL 400 Type FT-NMR, from JEOL Ltd.)).

In the present invention, it is possible to use, as the elastic layer 2B, not only the addition-curable silicone rubber, but also condensation-curable silicone rubbers. In that case, the curing time and properties of the silicone rubber may be unstable, depending on working environments such as humidity and temperature. Therefore, it is desirable to use a curing agent in combination, in order to keep, in particular, deep curing stability.

(3-2) Filler

As the highly thermal conductive filler mixed in the elastic layer 2B, metal silicon, alumina, zinc oxide, and silicon carbide are preferred in terms of thermal conductivity and cost, and can be used alone or in mixture.

(3-3) Strength of Elastic Layer

The tensile strength of the elastic layer 2B is preferably 0.4 MPa or more and 2.0 MPa or less, particularly 0.7 MPa or more and 1.6 MPa or less. The tensile strength in this range can cause the elastic layer 2B of the fixing member to have sufficient strength.

The tensile strength of the elastic layer 2B refers to the tensile strength (TS) measured with the use of a dumbbell third specimen in accordance with the JIS K6251:2010. The tensile strength is obtained in a way that the maximum pulling force recorded in the case of pulling until the specimen is cut is divided by the initial cross section of the specimen. The test is carried out three times, and the average value is regarded as the tensile strength.

The tensile strength of the elastic layer 2B can be increased by increasing the degree of cross-linkage of the organopolysiloxane in the silicone rubber composition. Specifically, increasing the proportion of the unsaturated aliphatic group and active hydrogen bonded to silicon makes it possible to increase the tensile strength.

(3-4) Method for Forming Elastic Layer

The elastic layer 2B is formed on the substrate 2A subjected to primer treatment in advance. A ring coating method can be used as the method for forming the elastic layer 2B.

Figure 3:
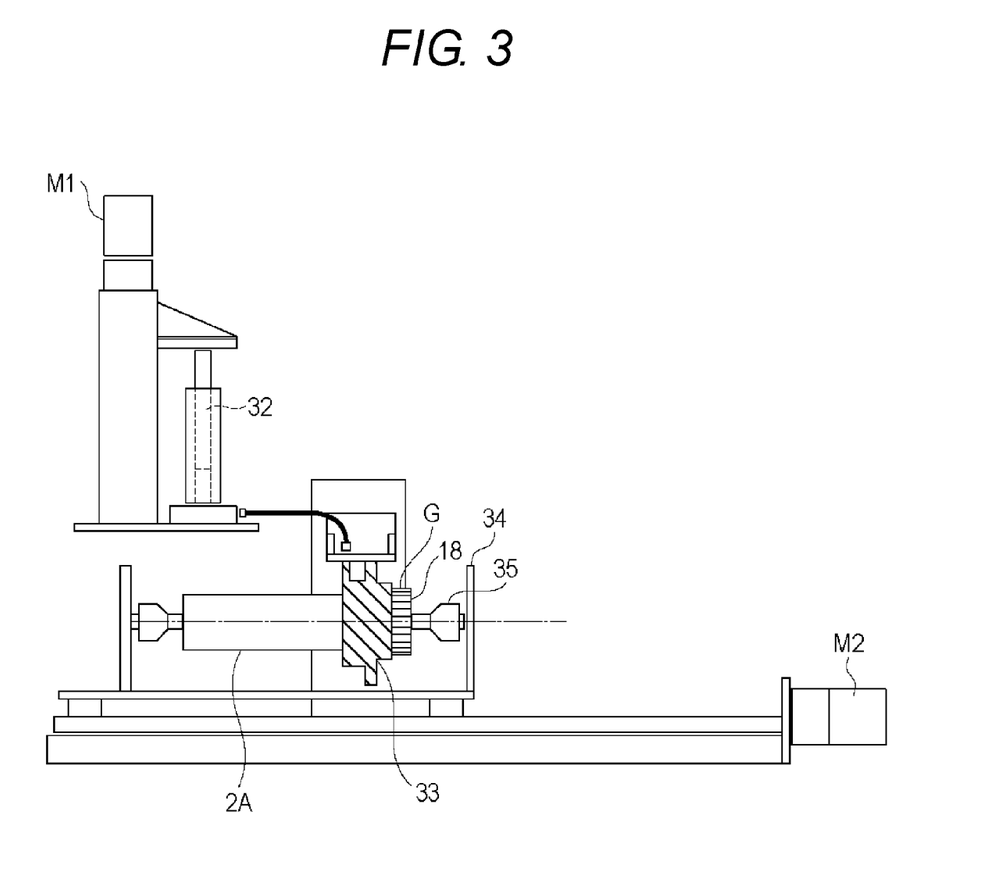
FIG. 3 is a schematic diagram of a ring coater for preparing a fixing film.

FIG. 3 is a schematic diagram for explaining a method for forming the elastic layer by a so-called ring coating method. The substrate 2A which is an endless belt member is put on a cylindrical core 18 that is exactly circular in cross section, with the outer perimeter of the circle nearly equal to the inner perimeter of the substrate 2A, and placed on the core 18 so that the substrate 2A is not loosened. Next, the core 18 with the substrate 2A placed thereon is fixed in a moving stage 34 with a chucking attachment 35. A cylinder pump 32 is filled with the addition-curable silicone rubber composition of the addition-curable silicone rubber and highly thermal conductive filler included. Then, the composition is fed under pressure with a pressure-operated motor M1 to apply the composition to the peripheral surface of the substrate 2A from an application liquid supply nozzle 33. In this case, while the addition-curable silicone rubber composition is applied, the moving stage 34 with the substrate 2A and the core 18 fixed is moved at a constant velocity rightward in FIG. 3 with a driving motor M2. Thus, a coating film of the addition-curable silicone rubber composition G, which is to serve to the elastic layer 2B, can be formed on the entire outer peripheral surface of the substrate 2A. The thickness of the coating film can be controlled depending on the clearance between the application liquid supply nozzle 33 and the surface of the substrate 2A, the supply rate of the addition-curable silicone rubber composition, and the moving velocity of the substrate 2A (the stage 34). The uncured addition-curable silicone rubber layer formed on the substrate 2A is subjected to curing by causing a cross-linking reaction to proceed through the heating for a certain period of time by a conventionally known heating member such as an electric furnace or an infrared heater.

The method for forming the elastic layer 2B is not limited to the ring coating method described above. As other method for the formation, a method can be also used in which the substrate 2A is coated with a uniform thickness of material including a liquid silicone rubber by methods such as a blade coating method, and then subjected to curing by heating. Besides, it is also possible to use a method in which a material including a liquid silicone rubber is injected into a molding die, and subjected to curing by heating, a method in which the material is subjected to extrusion molding, and then curing by heating, or a method in which the material is subjected to injection molding, and then curing by heating.

(4) Release Layer 2C (4-1) Configuration of Release Layer 2C

The release layer 2C is provided in direct contact with the surface of the elastic layer 2B. More specifically, the release layer 2C is not to be considered bonded to the elastic layer with an adhesive or a primer. In addition, the release layer 2C is not to be considered to refer to an adhesive layer or a primer layer.

The release layer 2C includes a fluorine resin selected from the group consisting of a tetrafluoroethylene-perfluoroalkylvinylether copolymer (PFA), a tetrafluoroethylene-hexafluoropropylene copolymer (FEP), a polytetrafluoroethylene (PTFE), an ethylene-tetrafluoroethylene copolymer (ETFE), a polychlorotrifluoroethylene (PCTFE), an ethylene-chlorotrifluoroethylene copolymer (ECTFE), and a polyvinylidene fluoride (PVDF). One of these fluorine resins can be used, or two or more thereof can be used in combination. The fluorine resin transmits ultraviolet light well, and ultraviolet light is thus believed to reach even the surface of contact between the elastic layer 2B and the fluorine resin. Therefore, the binding reaction between the silicone rubber and the fluorine resin is believed to bond the elastic layer 2B and the release layer 2C in a favorable manner.

The tetrafluoroethylene-perfluoroalkylvinylether copolymer (PFA), which is excellent, in particular, in heat resistance, can be preferably used as the fluorine resin. The form of the copolymerization in the PFA is not particularly limited, but examples of the copolymerization include a random copolymer, a block copolymer, and a graft copolymer. In addition, the content molar ratio between tetrafluoroethylene (TFE) and perfluoroalkyl vinyl ether (PAVE) in the PFA is not to be considered particularly limited. Specifically, the PFA in which the content molar ratio of TFE/PAVE is 94/6 to 99/1 can be preferably used.

The fluorine resin mentioned above is preferably contained substantially as only a binding resin in the release layer 2C. This is because containing other resin constituent as a binding resin makes ultraviolet light more likely to be absorbed by the resin constituent. Specifically, it is preferable to contain no ultraviolet curable resin such as a (meth) acrylic resin, which is cured by ultraviolet light irradiation.

Other constituents may be added to the release layer 2C, to the extent that ultraviolet light is not prevented from being transmitted in the release layer 2C. Specifically, a spherical silica, a fibrous carbon filler, or a zinc oxide filler is preferably used in terms of improvements of abrasion resistance and releasability.

It is preferable that the release layer 2C contains, as constituent elements, a carbon atom, a fluorine atom, and an oxygen atom, and the proportion of the sum of the numbers of carbon atoms, fluorine atoms, and oxygen atoms is 90% or more and 100% or less to the number of all constituents elements in the release layer. Further, more preferably, the proportion is 95% or more, further preferably 99% or more. When the proportion of the sum of the numbers of carbon atoms, fluorine atoms, and oxygen atoms is 90% or more, ultraviolet light reaches well the surface of contact between the elastic layer 2B and the release layer 2C in a step of ultraviolet light irradiation as will be described later, thereby making the adhesion between the elastic layer 2B and the release layer 2C favorable.

In order to cause the proportion of the sum of the numbers of carbon atoms, fluorine atoms, and oxygen atoms to the number of all constituent elements in the release layer 2C to fall within the range mentioned above, it is preferable for the release layer 2C to contain none of ultraviolet absorbing compounds such as aromatic hydrocarbons, aromatic carboxylic acids and salts thereof, aromatic aldehydes, aromatic alcohols, aromatic amines and salts thereof, aromatic sulfonic acids and salts thereof, and phenols, or none of photocatalysts such as titanium oxides.

While it is possible for the proportion of the constituent elements in the release layer 2C to be obtained from measurement by a known method such as EDS analysis (Energy Dispersive X-ray Spectroscopy) or EPMA analysis (Electron Probe MicroAnalyser), the proportion is measured by EPMA analysis in the present invention. The measurement method will be described in detail in examples.

The thickness of the release layer 2C is preferably 50 μm or less in order to improve the fixing performance. Considering that the release layer 2C (fluorine resin tube) is abraded by rubbing against paper, the thickness thereof is preferably 10 μm or more.

(4-2) Method for Forming Release Layer

As the release layer 2C, a fluorine resin tube is preferably used from the perspective of moldability and toner releasability. The fluorine resin tube can be obtained in a way that the fluorine resin material mentioned above is supplied to an extruder, melted by heating, extruded through a die that has a ring shape in a predetermined size, and cooled.

Molding is preferably carried out so that the inside diameter of the fluorine resin tube is smaller than the outside diameter of the elastic layer 2B. This is for coating the fluorine resin tube increased in diameter with the elastic layer 2B in a step of coating the fluorine resin tube as will be described later. In the step, specifically, the difference between the inside diameter of the fluorine resin tube after the insertion of the elastic layer 2B, that is, the outside diameter of the elastic layer 2B, and the inside diameter of the fluorine resin tube before the insertion falls within the range of 4% or more and 7% or less on the basis of the inside diameter of the fluorine resin tube before the insertion.

(5) Adhesion Between Elastic Layer and Release Layer

In regard to the fixing member, it is important for the elastic layer to undergo a cohesive failure in a 90° peeling adhesion strength test (hereinafter, also referred to simply as a "peeling test") as specified by the Japan Industrial Standards (JIS) K 6854-1:1999.

Figure 4:
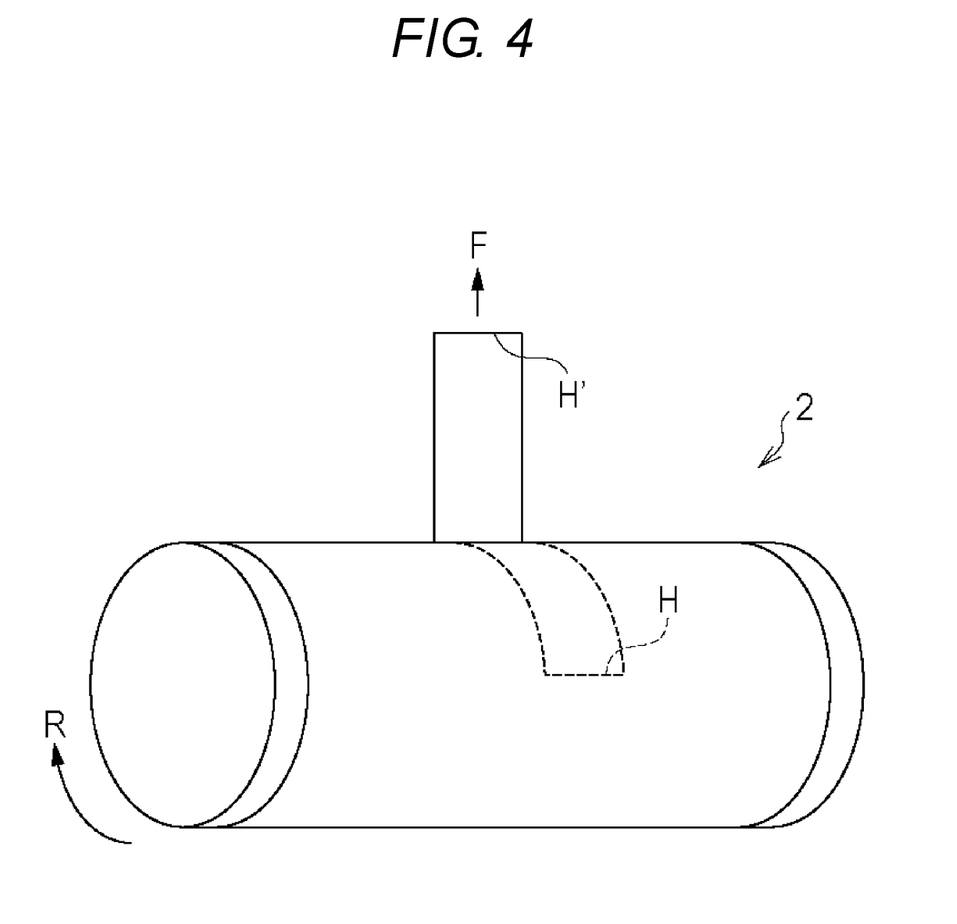
FIG. 4 is an explanatory diagram illustrating a peeling end of a fixing film surface and a traveling direction of peeling in a peeling test.

FIG. 4 shows a schematic diagram for the peeling test. The core (not shown) is inserted into the fixing film 2, and held by nipping both ends of the core from the outside with a bearing (not shown) which is rotatable in a direction R in FIG. 4. Next, a slit of 25 mm in width is made with the use of a razor in a circumferential direction of the member of the fixing film 2 from the surface of the release layer so as to reach the surface of the elastic layer. The slit in this case is 40 to 200 μm in depth as a guide. Next, a cut is made at a site where the slit was made, in a longitudinal direction of the fixing film 2, and the site is regarded as a peeling end H. It is to be noted that the circumferential length of the slit is 50 to 90 mm from the peeling end H.

At this peeling end H, the release layer is forced to be peeled with the use of a razor from the interfacial part between the release layer and the elastic layer, and the peeling end H is nipped with a force gauge of a peeling evaluation tester. Next, the surface part is pulled at a rate per minute (50 mm/min) in a vertical direction F from just above a rotating shaft of the core, and peeled until the circumferential length reaches 70 mm. In this regard, it is important for the peeling direction F to keep 90° with respect to the direction of the tangent to the main body of the fixing film 2 at the base of the peeling end H, while the peeled distance reaches at least 70 mm. As a specific method for keeping 90°, in nipping the peeling end H with the force gauge of the peeling evaluation tester, the end is nipped so that the peeled surface makes 90°. Next, at the same time as peeling at a constant moving speed (50 mm/min) in the vertical direction F from just above the rotating shaft of the core, the core may be rotated in the direction R in FIG. 4 so that the moving speed of the core at the tangent line is equal to the moving speed in the vertical direction F. Specifically, when the fixing film 2 is 30 mm in outside diameter, rotating the core at 0.53 rpm (rotation per minute) makes it possible for the peeling direction F to keep the angle 90° with respect to the direction of the tangent to the main body of the fixing film 2 at the base of the peeling end H.

The failure mode of the elastic layer is determined in accordance with the "Adhesives-Designation of main failure patterns" as required by the Japanese Industrial Standards (JIS) K6866:1999, for the fractured surface formed by the peeling test.

Adhesive failure: an adhesive bonding failure with a crack visually found at the interface between an adhesive and a coating agent Cohesive failure: a bonded stack failure with a crack visually found in an adhesive or a coating agent More specifically, in the present invention, the cohesive failure of the elastic layer is a visible failure with a crack of the fractured surface in the elastic layer.

(6) Method for Manufacturing Fixing Member

The fixing film 2 can be manufactured by the step of: forming the elastic layer 2B including a silicone rubber on the substrate 2A; laminating the release layer 2C composed of the fluorine resin tube mentioned above to be brought into direct contact with the surface of the elastic layer 2B; and bonding the elastic layer 2B and the release layer 2C by irradiating the surface of contact between the elastic layer 2B and the release layer 2C with ultraviolet light irradiation.

(6-1) Step of Laminating Fluorine Resin Tube on Surface of Elastic Layer

As described previously, the fluorine resin tube is molded so that the inside diameter thereof is smaller than the outside diameter of the elastic layer 2B. Then, the fluorine resin tube is kept increased in diameter by putting the fluorine resin tube on the cylindrical elastic layer 2B.

The coating method with the fluorine resin tube is not particularly limited, but a method of coating with the fluorine resin tube expanded externally (hereinafter, also referred to as an "expansion coating method") can be preferably used. In the expansion coating method, when the substrate 2A has the form of a belt, a cylindrical or columnar core 18 is inserted into the substrate 2A with the elastic layer 2B formed on the surface, and the combination W of the both (hereinafter, also referred to as "a substrate W with a cylindrical elastic layer") is coated at the outer periphery thereof with the fluorine resin tube.

Figure 5:
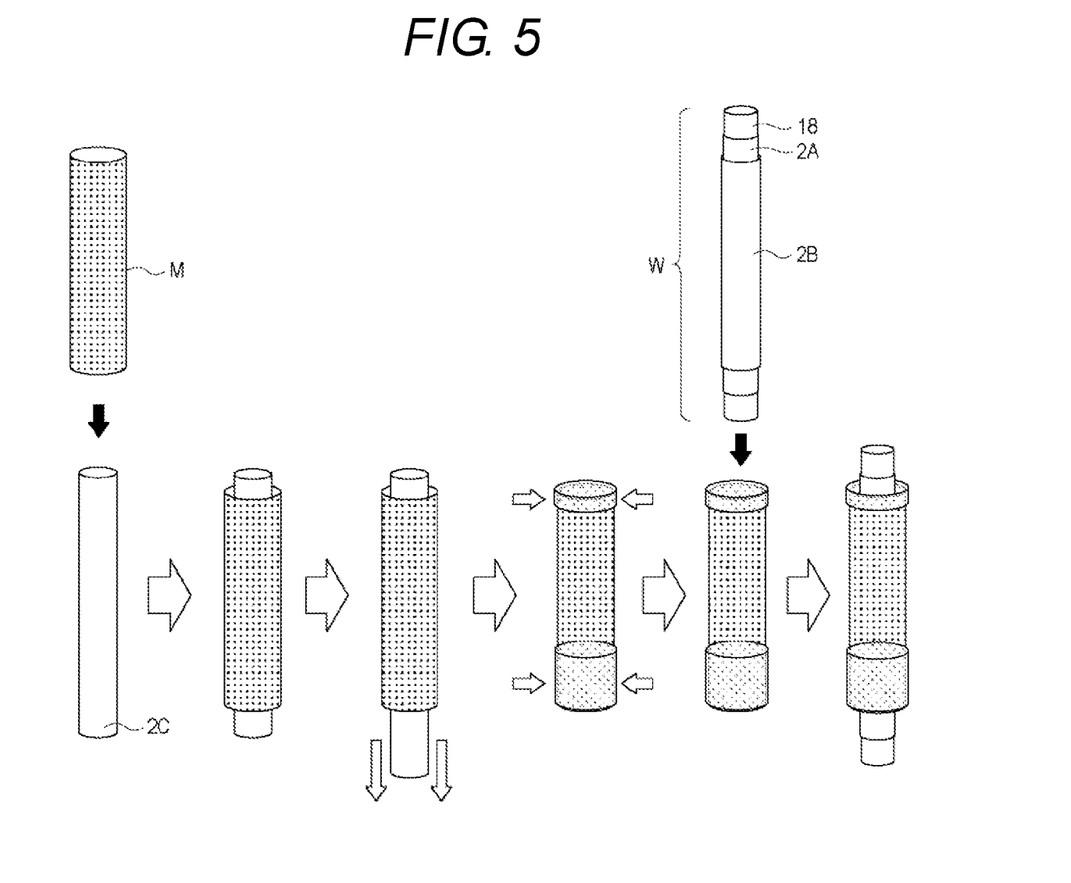
FIG. 5 is a schematic diagram for explaining an expansion coating method for a fluorine resin tube.

The expansion coating method will be described in detail with reference to FIG. 5. The fluorine resin tube 2C is disposed on the inner surface of a tubular expandable form M that has an inside diameter larger than the outside diameter of the substrate W with the cylindrical elastic layer. The fluorine resin tube 2C is extended to a predetermined extension percentage, the fluorine resin tube 2C is turned back to the outside surface of the tubular expandable form M, and the turned-back ends of the fluorine resin tube 2C are fixed. In this regard, the fluorine resin tube 2C kept extended will be fixed on the tubular expandable form M.

It is preferable to use a form made of quartz glass for the tubular expandable form M. This is because the quartz glass which has a high ultraviolet transmission thus makes it possible to irradiate the outside surface of the tubular expandable form M with ultraviolet light in the ultraviolet light irradiation step as will be described later. However, the present invention is not limited thereto, but it is also possible to use a metallic tubular expandable form. In this case, the belt has removed from the tubular expandable form M is irradiated with ultraviolet light in the step of ultraviolet light irradiation as will be described later.

Next, the gap between the outer surface of the fluorine resin tube 2C and the inside surface of the tubular expandable form M is turned into a vacuum to firmly attach the outer surface of the fluorine resin tube 2C and the inside surface of the tubular expandable form M. Then, the substrate W with the cylindrical elastic layer is inserted into the fluorine resin tube 2C. The inside diameter of the tubular expandable form M is not to be considered particularly limited as long as the insertion is achieved smoothly. Thereafter, the vacuum state of the gap between the outer surface of the fluorine resin tube 2C and the inside surface of the tubular expandable form M is broken to firmly attach the fluorine resin tube 2C to the surface of the elastic layer 2B.

In this regard, it is preferably increase the diameter of the fluorine resin tube 2C in the range (hereinafter, a "diameter increase percentage") of 4% or more and 7% or less, on the basis of the inside diameter before the increase in diameter. This diameter increase percentage is able to be achieved by adjusting the size of an annular die for use in the extrusion molding of the fluorine resin tube 2C with respect to the outside diameter of the substrate W with the cylindrical elastic layer, and the pull-down ratio in the extrusion molding.

In addition, it is preferable to extend the fluorine resin tube 2C in a longitudinal direction of the fluorine resin tube 2C within the range (hereinafter, an "extension percentage") of 6% or more and 8% or less, on the basis of the entire length of the fluorine resin tube 2C. This is because, in the case of coating the fluorine resin tube 2C which has an inside diameter smaller than the outside diameter of the substrate W with the cylindrical elastic layer, the longitudinal dimension of the fluorine resin tube 2C is shortened by the increase in diameter in a circumferential direction, as compared with the length before the increase in diameter. In this regard, the entire length of the fluorine resin tube 2C is based on the length of the fluorine resin tube 2C after the substrate W with the cylindrical elastic layer is coated with the fluorine resin tube 2C.

The present step may employ a method of coating the elastic layer with the fluorine resin tube, and then extending the fluorine resin tube by a predetermined amount, besides the method of coating with the fluorine resin tube extended by a predetermined amount in advance as described above. In the latter case, it is preferable interpose a volatile liquid or the like in advance between the fluorine resin tube and the elastic layer, in order to enhance smoothness between the inside surface of the fluorine resin tube and the surface of the elastic layer.

(6-2) Step of Bonding Elastic Layer and Fluorine Resin Tube

In the present step, the outside of the fluorine resin tube 2C put on the surface of the elastic layer 2B in the previous step is irradiated with ultraviolet light to bond the elastic layer 2B and the fluorine resin tube 2C.

The light source for ultraviolet light irradiation is not particularly limited, but a low-pressure mercury lamp with a center wave at 254 nm or an excimer UV lamp with a center wavelength at 172 nm is preferably used.

The outside of the fluorine resin tube 2C is irradiated with ultraviolet light in the wavelength ranges, thereby causing the fluorine resin tube 2C to transmit the ultraviolet light, and irradiating the surface of contact between the elastic layer 2B and the fluorine resin tube 2C. In this case, at the surface of contact, the surface of the elastic layer 2B including the silicone rubber is believed to absorb the ultraviolet light, and generate active species such as methyl radicals and hydroxyl radicals through dissociation of Si—C bonds and C—H bonds derived from the silicone rubber. These active species are highly reactive, and believed to abstract fluorine atoms in the fluorine resin tube 2C in contact, thereby forming a bond between the silicone and the fluorine resin. As a result, it is believed that the fluorine resin tube 2C is bonded to the elastic layer 2B.

The integrated amount of light per unit area from the ultraviolet light for irradiating the surface of contact between the elastic layer 2B and the fluorine resin tube 2C is preferably 300 mJ/cm$^2$ or more and 5000 mJ/cm$^2$ or less. The integrated amount of light from the ultraviolet light in the range mentioned above provides a fixing film which is highly adhesive and sufficiently flexible.

The integrated amount of light from the ultraviolet light can be measured by a known method. The amount of ultraviolet light is measured for a certain period of irradiation time by setting on the core 18 so that the distance between the surface of an ultraviolet actinometer (for example, an ultraviolet integral actinometer (Trade Name: C8026/H8025-18510; from Hamamatsu Photonics K.K.)) and an ultraviolet lamp is almost equal to the distance to the surface of the silicone rubber layer. Thus, the integrated amount of light per unit area can be calculated at the position of the silicone rubber layer surface.

(7) Boundary Region Between Elastic Layer and Release Layer

The formation of a new bond between the release layer and the elastic layer in the fixing member (fixing film) obtained by the manufacturing method described in the section (6) can be confirmed with a narrow scan spectrum obtained by X-ray photoelectron spectroscopy (XPS).

When the release layer includes a fluorine resin selected from the group consisting of a tetrafluoroethylene-perfluoroalkylvinylether copolymer (PFA) and a tetrafluoroethylene-hexafluoropropylene copolymer (FEP), a peak that indicates a bonding state of a fluorine atom has been found to be shifted toward lower energy than the peak of binding energy of a —$CF_2$—$CF_2$— skeleton in a narrow scan spectrum obtained by X-ray photoelectron spectroscopy focused on the electron state in the is orbital of the fluorine atom in a boundary region between the elastic layer and the release layer in a cross section of the fixing member along the thickness direction. From the foregoing, in the —$CF_2$—$CF_2$— skeleton as a main skeleton of PFA or FEP, it is presumed that the bond between C and F is broken, thereby the F is bonded to an element that is lower in electronegativity than the C. Further, the element that is lower in electronegativity than the C atom, which is present in a boundary region between the PFA or FEP and the elastic layer, is believed to be silicon, and a bond between the fluorine atom and the silicon atom is thus presumed to be formed in the boundary region.

More specifically, the peak that indicates the bonding state of the fluorine atom has been shifted toward at least 2 eV lower energy than the position of the peak top of the binding energy of the —$CF_2$—$CF_2$— skeleton. Further specifically, when the position of the peak top of the peak of the binding energy of the —$CF_2$—$CF_2$— skeleton is standardized to 688.7 eV, the position of the peak top of the peak that indicates the bonding state of the fluorine atom is located in the range of 686.3±0.5 eV.

Details will be given in an example on the method for measuring a narrow scan spectrum by X-ray photoelectron spectroscopy.

(8) Image Forming Apparatus

Figure 2A:
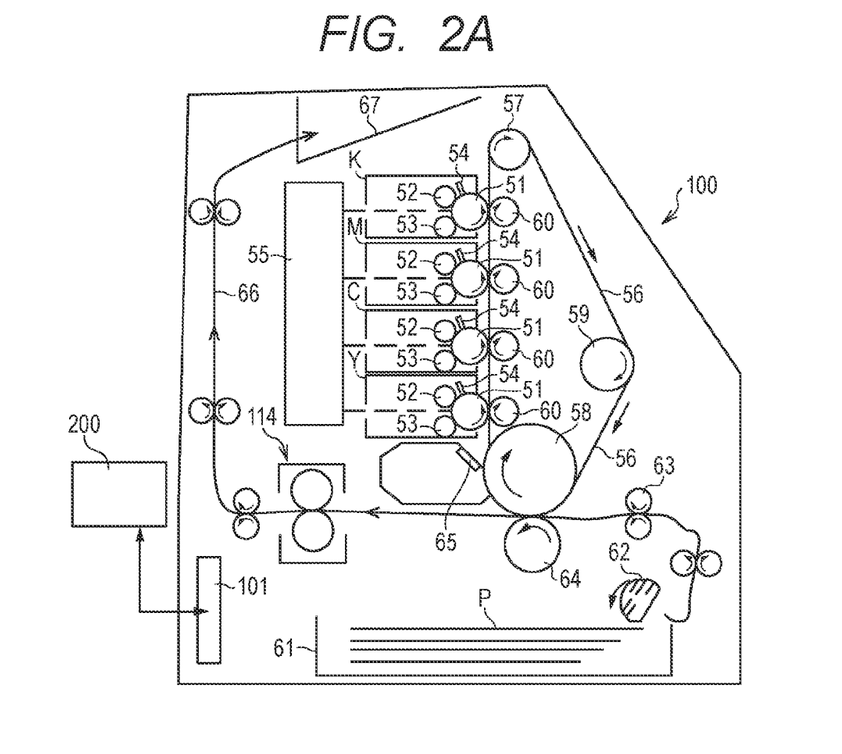
FIG. 2A is a schematic diagram illustrating an example of the configuration of an image forming apparatus according to the present invention.
Figure 2B:
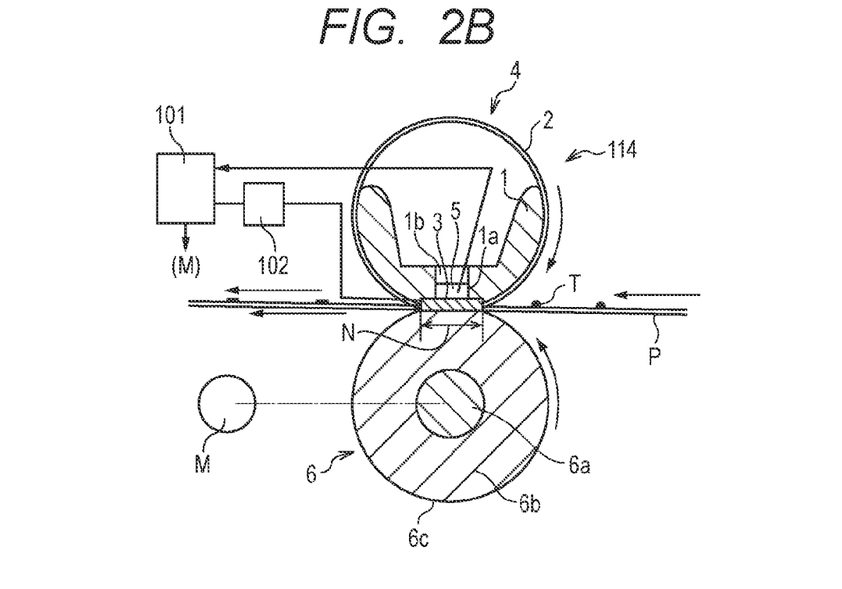
FIG. 2B is a cross sectional schematic diagram illustrating an example of the configuration of an image heating apparatus according to the present invention.

FIG. 2A is a configuration schematic diagram of an example of an image forming apparatus 100, as an example of an image forming apparatus according to the present invention, which is equipped with an image heating apparatus 114 using the fixing film as a fixing apparatus for fixing an unfixed toner image on a recording medium by heat treatment. This image forming apparatus 100 is a color printer using an electrophotography system.

The image forming apparatus 100 forms a color image on a sheet-like recording medium P as a recording medium (recording media), on the basis of an electrical image signal that is input to a control circuit unit (control unit) 101 in the image forming apparatus from an external host device 200 such as a personal computer or an image reader. The control circuit unit 101 includes a CPU (computation unit), a ROM (storage unit), and the like, and communicates various pieces of electrical information with the host device 200 or an operation unit (not shown) of the image forming apparatus 100. In addition, the control circuit unit 101 generally controls the image forming operation of the image forming apparatus 100 in accordance with a predetermined control program or a reference table.

Y, C, M, and K refer to four image forming units that form toner images in colors of yellow, cyan, magenta, and black, which are arranged in the order of Y, C, M, and K from the bottom in the image forming apparatus 100. The respective image forming units Y, C, M, and K each have an electrophotographic photosensitive drum 51 as an image bearing member, and a charging apparatus 52, a developing apparatus 53, and a cleaning apparatus 54 as a process unit that act on the electrophotographic photosensitive drum 51, and the like. The developing apparatus 53 of the image forming unit Y for yellow contains therein a yellow toner as a developer, whereas the developing apparatus 53 of the image forming unit C for cyan contains therein a cyan toner as a developer. The developing apparatus 53 of the image forming unit M for magenta contains therein a magenta toner as a developer, whereas the developing apparatus 53 of the image forming unit K for black contains therein a black toner as a developer, respectively. An optical system 55 that forms an electrostatic latent image through exposure to the electrophotographic photosensitive drums 51 is provided to correspond to the image forming units Y, C, M, and K for the four colors. As the optical system, a laser scanning exposure optical system is used.

In each image forming unit Y, C, M, or K, the electrophotographic photosensitive drums 51 uniformly charged by the charging apparatus 52 is subjected to scanning exposure by the optical system 55 on the basis of image data. Thus, an electrostatic latent image corresponding to a scanning exposure image pattern is formed on the surface of the electrophotographic photosensitive drum 51. The electrostatic latent image is developed as toner image by the developing apparatus 53. More specifically, for example, a yellow toner image corresponding to a yellow component image of a full-color image is formed on the electrophotographic photosensitive drum 51 of the image forming unit Y for yellow.

The toner images in the colors mentioned above, which are formed on the electrophotographic photosensitive drums 51 of the respective image forming units Y, C, M, and K, are superimposed in order in predetermined alignment for primary transfer in synchronization with the rotation of the respective electrophotographic photosensitive drums 51 onto an intermediate transfer body 56 that rotates at a substantially equal speed. Thus, an unfixed full-color toner image is formed by synthesis on the intermediate transfer body 56. In the present embodiment, an endless intermediate transfer belt is used as the intermediate transfer body 56, and the intermediate transfer belt 56 is wrapped and stretched on three rollers of a driving roller 57, a roller 58 opposed to a secondary transfer roller, and a tension roller 59, and driven by the driving roller 57.

Primary transfer rollers 60 are used as units for primary transfer of the toner images from the electrophotographic photosensitive drums 51 of the respective image forming units Y, C, M, and K to the intermediate transfer belt 56. A primary transfer bias that has a reverse polarity to the toners is applied to the primary transfer rollers 60 from a bias supply, not shown. Thus, the toner images are primarily transferred from the electrophotographic photosensitive drums 51 of the respective image forming units Y, C, M, and K to the intermediate transfer belt 56.

After the primary transfer of the toner images from the electrophotographic photosensitive drums 51 to the intermediate transfer belt 56 in the respective image forming units Y, C, M, and K, the toners remaining on the electrophotographic photosensitive drums 51 are removed by the cleaning apparatus 54.

The step mentioned above is carried out for each color of yellow, cyan, magenta, and black in synchronization with the rotation of the intermediate transfer belt 56, in a way that the primarily transferred toner images for each color are formed by sequential superimposition on the intermediate transfer belt 56. It is to be noted that the step is carried out only for a target color in the case of merely monochromatic image formation (monochromatic mode).

On the other hand, a sheet of recording medium P in a recording medium cassette 61 is separated and fed at a predetermined timing by a feeding roller 62. Then, the recording medium P is conveyed at a predetermined timing by a pair of resist rollers 63 to a transfer nip part as an pressure contact part between a part of the intermediate transfer belt 56 wrapped on the roller 58 opposed to a secondary transfer roller and a secondary transfer roller 64. The primarily transferred toner images formed on the intermediate transfer belt 56 are collectively transferred onto the recording medium P (secondary transfer), with a bias that has a reverse polarity to the toners, applied by a bias supply, not shown, to the secondary transfer roller 64.

The secondary transfer remaining toners remaining on the intermediate transfer belt 56 after the secondary transfer is removed by an intermediate transfer belt cleaning apparatus 65. The unfixed toner images secondarily transferred on the recording medium P are melted and fixed in color mixture on the recording medium P by the image heating apparatus 114, and discharged as a full-color print through a discharge path 66 to a catch tray 67.

(9) Image Heating Apparatus

The image heating apparatus refers to an apparatus that applies heat treatment with heat and pressure to a recording medium with an image supported thereon. Examples of such an image heating apparatus include an apparatus that applies heat treatment to unfixed toner images on a recording medium, thereby fixing or tentatively fix the images. Further, the examples include a gloss enhancement apparatus that applies heat treatment to an image fixed on a recording medium, thereby enhancing the gloss of the image, and an apparatus that applies heat treatment for drying to a recording medium with an image formed thereon by an ink-jet method.

FIG. 2B is a cross-sectional schematic diagram of a main part of the image heating apparatus 114 using the fixing film 2 as a member for electrophotography. In the description below, the heating apparatus 114 and members constituting the image heating apparatus 114, the longer direction refers to a direction perpendicular to the direction of conveying the recording medium P in the plane of the recording medium P, whereas the shorter direction refers to a direction parallel to the direction of conveying the recording medium P in the plane of the recording medium P. In addition, the width refers to a dimension along the shorter direction, whereas the length refers to a dimension along the longer direction.

The image heating apparatus 114 in the present example is a so-called tensionless-type image heating apparatus based on a film heating method, which is basically a well-known technique. The image heating apparatus based on a film heating method uses, as the fixing member, the heat-resistance fixing film 2 in a flexible endless belt or cylinder form. Further, the apparatus is adapted to make at least a part of the perimeter of the fixing film 2 always tension-free (without any tension applied), and drive the rotation of the fixing film 2 by a rotary driving force of a pressure roller (pressure rotor) 6. In the present embodiment, the fixing film 2 as the fixing member is a film configured as described above.

In FIG. 2B, a stay 1 as both a heating body support member and a film guiding member is a rigid member made of a heat resistant resin in a gutter form that is long in the longer direction (a direction perpendicular to the drawing), and substantially semi-circular is cross section. In the present embodiment, a highly heat-resistant liquid crystal polymer is used as a material for the stay 1. In addition, near a central part of the stay 1 along the longer direction, a hole 1b that houses a thermistor (temperature sensing element) 5 disposed to be brought in contact with the heater 3 as a heating member is provided in communication with a groove 1a. The heater 3 is, in the present embodiment, a so-called ceramic heater, and fixed and supported to fit in the groove 1a provided along the longer direction of the stay 1 in the center along the shorter direction at the lower side of the stay 1.

The fixing film 2 as the fixing member is a cylindrical film that is flexible and excellent in heat resistance, and adapted, with margin for the perimeter, to loosely fit on the outer perimeter of the stay 1 which supports the heater 3. Moreover, on the inner peripheral surface (inner surface) of the fixing film 2, a grease is applied for improving slidability on the heater 3. The stay 1, the heater 3, the fixing film 2, and the like mentioned above constitute a heating assembly 4.

The pressure roller (pressure rotor) 6 as a backup member is opposed to the heater 3 held in the stay 1, with the fixing film 2 interposed therebetween. The pressure roller 6 in the present embodiment is configured to have a round shaft mandrel 6a such as iron, stainless steel, and aluminum coated with a silicone foam as a heat resistant elastic layer 6b, and further coated with a fluorine resin tube as a release layer 6c. Further, a predetermined pressure is applied by a pressurizing mechanism (not shown) between the stay 1 and the pressure roller 6. This pressure causes the elastic layer 6b of the pressure roller 6 undergo elastic deformation along the heater 3 with the fixing film 2 interposed therebetween. Thus, the pressure roller 6 forms a nip part (fixing nip part) N that has a predetermined width required for fixing by heating unfixed toner images T supported on the recording medium P, while the fixing film 2 is interposed therebetween.

At least at the time of forming an image, the pressure roller 6 is rotary-driven at a predetermined speed in a counterclockwise direction indicated by an arrow by a motor (driving unit) M controlled by a control circuit unit 101. The rotation of the pressure roller 6 generates a frictional force between the pressure roller 6 and the fixing film 2 at a nip part N. Thus, the fixing film 2 is rotated around the outer periphery of the stay 1 in a clockwise direction indicated by an arrow at a circumferential speed substantially corresponding to the rotational circumferential speed of the pressure roller 6, while sliding the inner surface of the film in close contact with the bottom of the heater 3. More specifically, it is rotated at almost the same circumferential speed as the speed of conveying the recording medium P with the unfixed toner images T thereon, which is conveyed from the image forming unit side.

In addition, the temperature of the heater 3 is increased through the supply of electric power from a power-supply device 102. The temperature of the heater 3 is sensed by the thermistor 5, and information on the detected temperature is fed back to the control circuit unit 101. The control circuit unit 101 controls the electric power input from the power-supply device 102 to the heater 3 so that the sensed temperature input from the thermistor 5 is kept at a predetermined target temperature (fixing temperature).

With the heater 3 adjusted to a predetermined fixing temperature and the pressure roller 6 rotary-driven, the recording medium P with the unfixed toner images T is, with the toner image supporting surface facing the fixing film 2, introduced into the nip part N. The recording medium P is brought into close contact with the outside surface of the fixing film 2 at the nip part N, and sandwiched and conveyed along with the fixing film 2. Thus, heat of the heater 3 and a pressure are imparted respectively through the fixing film 2 and the pressure roller 6 to the recording medium P to fix the unfixed toner images T on the surface of the recording medium P. The recording medium P passing through the nip part N is self-separated from the outer peripheral surface of the fixing film 2, and conveyed to the outside of the image heating apparatus 114.

EXAMPLES

The present invention will be specifically described below with reference to examples, but the present invention is not to be considered limited to only the examples.

Example 1-1

(10-1) Step of Forming Elastic Layer 2B of Fixing Film

A metal belt of SUS of 240 mm in length, 40 μm in thickness, and 30 mm in outside diameter (flexible endless belt member) was used as the substrate 2A. For a region of 230 mm in length excluding both ends of 5 mm on the outer peripheral surface, a rubber-based primer (Trade Name: X-33-174A/B, from Shin-Etsu Silicone Co., Ltd.) was used and applied onto the substrate 2A to apply a primer layer in a thin and uniform fashion. Then, this was put in an electrical oven, and dried for 30 minutes at 200° C. In addition, for a material of the elastic layer 2B, a well-known addition-curable liquid silicone rubber having a methyl group in a side chain (Trade Name: "KE-1281-A/B", from Shin-Etsu Silicone Co., Ltd.) was used, in which metal silicon filler of approximately 6.0 μm in average particle size in a fracture geometry (Trade Name: M-Si #600, from KINSEI MATEC CO., LTD.) was mixed as a thermal conductive filler. Specifically, the metal silicon filler was mixed therein to account for 30 volume % with respect to the silicone rubber. Thereafter, the mixture was stirred until reaching uniformity, and left under a reduced-pressure atmosphere for defoaming.

The thus prepared addition-curable silicone rubber composition was applied to the primer-applied region with a thickness of 300 μm on the substrate 2A by the previously mentioned ring coating method, and primarily vulcanized for 10 minutes in an oven set at 140° C. Next, secondary vulcanization was carried out while bonding the silicone rubber cylinder (elastic layer 2B) to the metal belt of SUS (substrate 2A) by firing for 4 hours at 200° C. in the same oven, thereby a belt with the elastic layer was obtained.

Further, the tensile strength was 0.9 MPa, which was measured with the use of a dumbbell third specimen in accordance with the Japanese Industrial Standards (JIS) K6251:2010, prepared under the same curing condition with the use of the addition-curable silicone rubber composition.

(10-2) Step of Laminating Release Layer 2C on Surface of Elastic Layer 2B

A Teflon (registered trademark) PFA pellet (Trade Name: 451HP-J, from Du Pont-Mitsui Fluorochemicals Company, Ltd.) was used to obtain a PFA tube of 15 μm in thickness and 29.4 mm in inside diameter by extrusion molding.

The belt with the elastic layer of 30.6 mm in outside diameter, formed on the previously mentioned metal belt of SUS, was coated with the PFA tube by an expansion coating method. The PFA tube in the present example has a circumferential expansion percentage of 4% and a longitudinal extension percentage of 8%. From the present step, it has been confirmed that the elastic layer 2B including the silicone rubber is brought into uniform contact with the release layer 2C including the PFA tube over the entire circumference without including any bubbles.

(10-3) Step of Bonding Elastic Layer 2B and Release Layer 2C

The multilayer body of the PFA tube in contact with the SUS belt with the elastic layer was irradiated with ultraviolet light from the surface of the PFA tube. An excimer UV lamp with a center wavelength of 172 nm (Trade Name: MEUT-1-500, from M. D. Excimer Inc.) was used as a light source for the ultraviolet light. In addition, the integrated amount of light during the ultraviolet irradiation is shown in Table 1. In accordance with the present step, the fixing film 2 was obtained where the release layer 2C composed of the PFA tube was bonded to the surface of the elastic layer 2B.

(10-4) Evaluation for Adhesion of Release Layer 2C

The above-mentioned peeling test was carried out on the fixing film 2 prepared. As a result, strong bonding between the release layer 2C and the elastic layer 2B has been confirmed from the fact that the cross section after the peeling test exhibited a cohesive failure. The evaluation result is shown in Table 1.

(10-5) Elemental Analysis of Release Layer 2C

Elemental analysis of the PFA tube corresponding to the release layer 2C of the fixing film 2 was performed with the use of an energy dispersive X-ray spectrometer (Trade Name: "Phoenix (Super-UFW), from EDAX"). Prior to the measurement, clipping into a size of 5 mm×5 mm was carried out at ten points from any location of the fixing film 2 to prepare a cross-section sample with the use of a cross section polisher (Trade Name: "SM09010") from JEOL Ltd. Next, the prepared cross-section sample was, as pretreatment, coated with a gold-palladium film of several nm with the use of a sputter coater (Trade Name: "108auto") from Cressington Scientific Instruments Ltd. Then, the elemental analysis was performed at five points along the thickness direction per sample, while the measurement condition was adapted to have an accelerating voltage of 5 kV in a point analysis mode. The ratio of the sum of carbon atoms, fluorine atoms, and oxygen atoms to all of constituent elements in the PFA tube was calculated from the result of the elemental analysis. It is to be noted that the calculated ratio refers to an arithmetic mean value for all of the measurement points. The result is shown in Table 1.

(10-6) Measurement of FPOT (First Print Out Time)

The fixing film 2 prepared according to the present example was mounted as the fixing film 2 of the image heating apparatus 114 in the laser beam printer illustrated in FIGS. 2A and 2B.

This laser beam printer was used to start the operation of forming an electrophotographic image, and execute the operation of passing the recording medium P with the unfixed toner images T through the image heating apparatus 114, thereby forming an electrophotographic image. In this regard, the formation of the electrophotographic image was started while the surface temperature of the fixing film 2 of the image heating apparatus 114 was room temperature (25° C.). The time was measured, which was required from the start to when the surface temperature of the fixing film 2 reached a fixable temperature (200° C.), thereby outputting a first electrophotographic image. This time is referred to as First Print Out Time (hereinafter, FPOT).

The FPOT of the fixing film according to Example 1 was 7.2 seconds. On the other hand, the FPOT was 7.6 seconds in the case of using a fixing film as prepared in Reference Example 1 as will be described later. More specifically, the fixing film according to the present example has succeeded in reducing the FPOT by 6% (=(0.4 seconds/7.2 seconds)× 100), as compared with the fixing film according to Reference Example 1. This indicates that the fixing film 2 according to Example 1 has thermal conductivity improved as compared with the fixing film according to Reference Example 1, because there is no adhesive layer that could be a thermal resistance layer between the elastic layer 2B and the fluorine resin tube 2C.

Examples 1-2, 1-3

In the same way as in Example 1-1 except that the integrated amount of light from the ultraviolet light was adjusted to the values listed in Table 1, the fixing films 2 according to Examples 1-2 and 1-3 were each prepared, and subjected to the evaluation. The evaluation result is shown in Table 1. Also in the present examples, in regard to adhesion, the failure mode was a cohesive failure in the elastic layer 2B.

Example 2-1

In the same way as in Example 1 except that a low pressure mercury UV lamp with a center wavelength of 254 nm (Trade Name: GLQ500US/11, from TOSHIBA LIGHTING & TECHNOLOGY CORPORATION (used to be HARISON TOSHIBA LIGHTING Corporation)) was used in place of the excimer UV lamp (Trade Name: MEUT-1-500, from M. D. Excimer Inc.) as a light source in the step of bonding the elastic layer 2B and the release layer 2C, the fixing film 2 was prepared, and subjected to the evaluation. The evaluation result is shown in Table 1. Also in the present example, in the adhesion evaluation, the failure mode was a cohesive failure in the elastic layer 2B.

Examples 2-2, 2-3

In the same way as in Example 2-1 except that the integrated amount of light from the ultraviolet light was adjusted to the values listed in Table 1, the fixing films 2 according to Examples 2-2 and 2-3 were each prepared, and subjected to the evaluation. The evaluation result is shown in Table 1. Also in the present examples, in regard to adhesion, the failure mode was a cohesive failure in the elastic layer 2B.

Example 3

In the same way as in Example 1 except that a FEP pellet (Trade Name: 140-J, from Du Pont-Mitsui Fluorochemicals Company, Ltd.) was used in place of the Teflon (registered trademark) PFA pellet (Trade Name: 451HP-J, from Du Pont-Mitsui Fluorochemicals Company, Ltd.) as a base material for the PFA tube in the step of laminating the release layer 2C on the surface of the elastic layer, the fixing film 2 was prepared, and subjected to the evaluation. The evaluation result is shown in Table 1. Also in the present example, in regard to adhesion, the failure mode was a cohesive failure in the elastic layer 2B.

Example 4-1

For the fixing film 2 prepared in Example 1-1, analysis of a boundary region between the release layer 2C and the elastic layer 2B was performed by the following method. A cryo-microtome (Trade Name: FC6; from Leica) was used to adjust the temperature environment of the fixing film 2 itself to −110° C., and cut the fixing film 2 in the thickness direction, thereby exposing a cross section.

In the boundary region between the release layer 2C and the elastic layer 2B in the cross section, a narrow scan spectrum was measured by X-ray photoelectron spectrometry (XPS) with the use of an X-ray photoelectron spectrometer (Trade Name: Quantera SXM; from ULVAC-PHI, Inc.). For the measurement, Al was used for an anticathode, the excitation condition was adjusted to 1.25 W×15 kV, the area of the sample to be irradiated with the X-ray was adjusted to Φ10 μm, and the photoelectron detection angle was adjusted to 45°. Because attention was focused on the peak of binding energy representing the electron state in the is orbital of a fluorine atom, the range of spectrum, Pass Energy, Step Size, and No-of-Sweeps (cumulated number) were adjusted respectively to 680 to 700 eV, 26 eV, 0.05 eV, and 10.

Figure 6A:
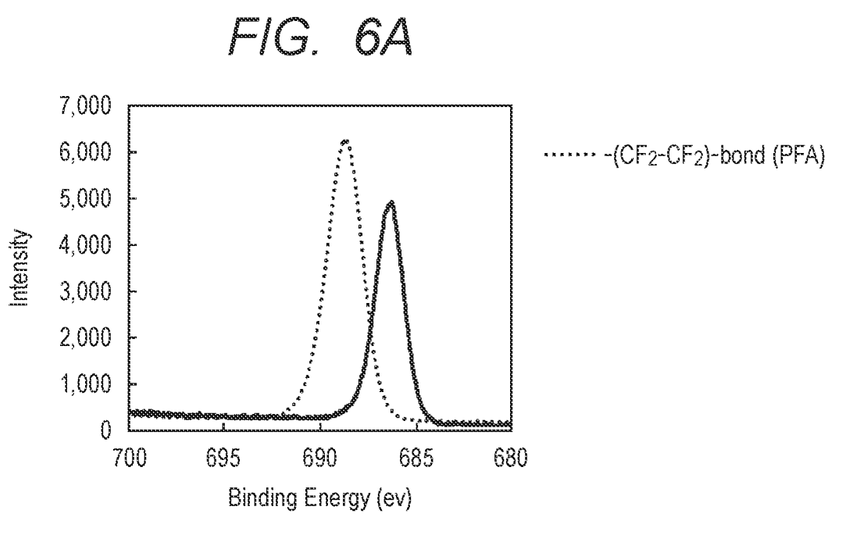
FIG. 6A is a narrow scan spectrum by XPS in an example (Example 4-1) of a member for electrophotography according to the present invention.

The obtained narrow scan spectrum is shown in FIG. 6A. It has been confirmed that the position of the peak top of binding energy representing the electron state in the is orbital of the fluorine atom is shifted from 688.7 eV to 686.3 eV in FIG. 6A.

From this result, in the —$CF_2$—$CF_2$— skeleton as a main skeleton of PFA, it is presumed that the bond between C and F is broken, thereby the F is bonded to an element that is lower in electronegativity than the C. Further, the element that is lower in electronegativity than the C atom, which is present in a boundary region between the PFA (release layer 2C) and the elastic layer 2B, is believed to be silicon, and a bond between the fluorine atom and the silicon atom is thus presumed to be formed in the boundary region.

Example 4-2

Figure 6B:
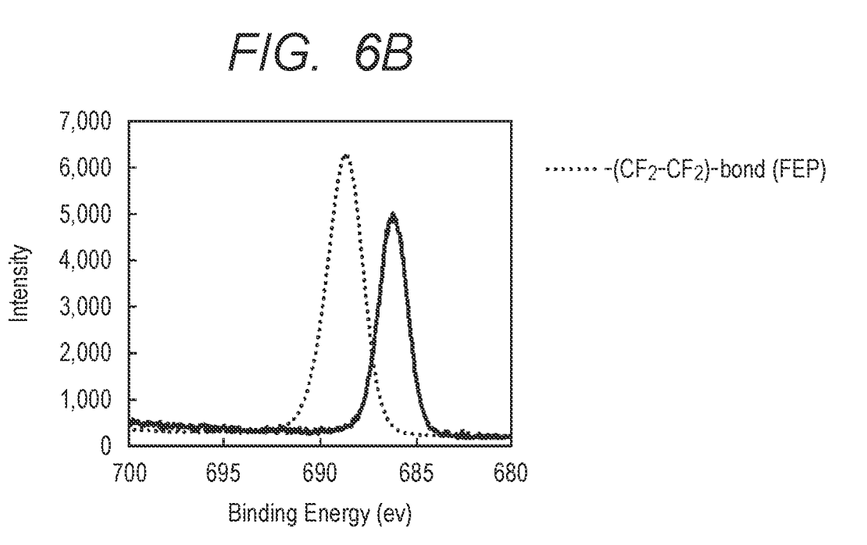
FIG. 6B is a narrow scan spectrum by XPS in an example (Example 4-2) of a member for electrophotography according to the present invention.

For the fixing film 2 prepared in Example 3, the exposure of a cross section and the measurement by XPS were achieved as is the case with Example 4-1.

The obtained narrow scan spectrum is shown in FIG. 6B. It has been confirmed that the position of the peak top of binding energy representing the electron state in the is orbital of a fluorine atom is shifted from 688.7 eV to 686.3 eV in FIG. 6B.

From this result, as is the case with Example 4-1, in the —$CF_2$—$CF_2$— skeleton as a main skeleton of PFA, it is presumed that the bond between C and F is broken, thereby the F is bonded to an element that is lower in electronegathe PFA tube by the expansion coating method, the fixing film 2 was prepared, and subjected to the evaluation. The evaluation result is shown in Table 1. Also in the present reference example, in the adhesion evaluation, the failure mode was a cohesive failure in the elastic layer 2B. It is to be noted that the FPOT of the fixing film according to Reference Example 2 was 7.5 seconds.

TABLE 1

| | Tube Material | Adhesive Layer Thickness [μm] | Center Wavelength [nm] | Distance [nm] | Irradiation Time [min] | Integrated Amount of Light [mJ/cm²] | Ratio of Elements (C) + (F) + (O) [At %] | Failure Mode |
|---|---|---|---|---|---|---|---|---|
| Example 1-1 | PFA | None | 172 | 3 | 3 | 1620 | 99.2 | Cohesive Failure |
| Example 1-2 | PFA | None | 172 | 1 | 3 | 4500 | 99.0 | Cohesive Failure |
| Example 1-3 | PFA | None | 172 | 1 | 1 | 1500 | 99.3 | Cohesive Failure |
| Example 2-1 | PFA | None | 254 | 3 | 30 | 900 | 99.8 | Cohesive Failure |
| Example 2-2 | PFA | None | 254 | 1 | 10 | 840 | 99.5 | Cohesive Failure |
| Example 2-3 | PFA | None | 254 | 1 | 5 | 420 | 99.5 | Cohesive Failure |
| Example 3 | FEP | None | 172 | 3 | 3 | 1620 | 99.6 | Cohesive Failure |
| Reference Example 1 | PFA | 10 | | No Irradiation | | | 99.5 | Cohesive Failure |
| Reference Example 2 | PFA | 4 | | No Irradiation | | | 99.7 | Cohesive Failure | tivity than the C. Further, the element that is lower in electronegativity than the C atom, which is present in a boundary region between the FEP (release layer 2C) and the elastic layer 2B, is believed to be silicon, and a bond between the fluorine atom and the silicon atom is thus presumed to be formed in the boundary region.

Reference Example 1

In the same way as in Example 1 except that an adhesive (Trade Name: SE1819CV/A&B, from Dow Corning Toray Co., Ltd.) was applied uniformly to the inside surface of the PFA tube to be 10 μm in thickness when the belt with elastic layer was coated with the PFA tube by the expansion coating method, and then subjected to curing and bonding the adhesive in a heating oven at 200° C., thereby forming the release layer 2C in the step of laminating the release layer 2C on the surface of the elastic layer, and that the surface of contact between the elastic layer 2B and the release layer 2C was not irradiated with ultraviolet light in the ultraviolet irradiation step, the fixing film 2 was prepared, and subjected to the evaluation. The evaluation result is shown in Table 1. Also in the present reference example, in the adhesion evaluation, the failure mode was a cohesive failure in the elastic layer 2B. It is to be noted that the FPOT of the fixing film according to Reference Example 1 was 7.6 seconds as mentioned above.

Reference Example 2

In the same way as in Reference Example 1 except that an adhesive (Trade Name: SE1819CV/A&B, from Dow Corning Toray Co., Ltd.) was applied uniformly to be 4 μm in thickness when the belt with elastic layer was coated with While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-201851, filed Sep. 30, 2014, and Japanese Patent Application No. 2015-171171, filed Aug. 31, 2015, which are hereby incorporated by reference herein in their entirety.

What is claimed is:

1. A member for electrophotography, comprising:
   a substrate;
   an elastic layer comprising a silicone rubber, provided on the substrate; and a release layer comprising a fluorine resin, provided in direct contact with a surface of the elastic layer,
   wherein the release layer comprises at least one fluorine resin selected from the group consisting of a tetrafluoroethylene-perfluoro(alkylvinylether) copolymer (PFA), a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVDF),
   wherein the elastic layer undergoes a cohesive failure when the release layer is peeled from the elastic layer in accordance with "Determination of peel strength of bonded assemblies Part 1: 90 degree peel" specified by Japanese Industrial Standards (JIS) K 6854-1:1999, and
   wherein a peak that indicates a bonding state of a fluorine atom is shifted toward a lower energy than a peak of a binding energy of a —$CF_2$—$CF_2$— skeleton in a narrow scan spectrum obtained by X-ray photoelectron spectroscopy focused on an electron state in a 1s orbital of a fluorine atom in a boundary region between the elastic layer and the release layer in a cross-section of the member for electrophotography along a thickness direction.

2. The member for electrophotography according to claim 1, wherein the release layer comprises PFA or FEP.

3. The member for electrophotography according to claim 1, wherein the release layer is 10 µm to 50 µm in thickness.

4. The member for electrophotography according to claim 1, wherein the silicone rubber is a cured product of an addition-curable silicone rubber composition.

5. The member for electrophotography according to claim 1, wherein the elastic layer has a tensile strength of 0.7 MPa to 1.6 MPa in accordance with Japanese Industrial Standards (JIS) K 6251: 2010.

6. The member for electrophotography according to claim 1, wherein the elastic layer is 50 µm to 1 mm.

7. The member for electrophotography according to claim 1, wherein the peak that indicates the bonding state of the fluorine atom is at least 2 eV shifted toward the lower energy than a position of a peak top of the binding energy of the —$CF_2$—$CF_2$— skeleton.

8. The member for electrophotography according to claim 1, wherein when a position of a peak top of the peak of the binding energy of the —$CF_2$—$CF_2$— skeleton is standardized to 688.7 eV, a position of a peak top of the peak that indicates the bonding state of the fluorine atom is at 686.3±0.5 eV.

9. A member for electrophotography, comprising:
a substrate;
an elastic layer comprising a silicone rubber, provided on the substrate; and a release layer comprising a fluorine resin, provided in direct contact with a surface of the elastic layer,
wherein the release layer comprises a fluorine resin selected from the group consisting of a tetrafluoroethylene-perfluoro(alkylvinylether) copolymer (PFA) and a tetrafluoroethylene-hexafluoropropylene copolymer (FEP), and
wherein a peak that indicates a bonding state of a fluorine atom is shifted toward a lower energy than a peak of a binding energy of a —$CF_2$—$CF_2$— skeleton in a narrow scan spectrum obtained by X-ray photoelectron spectroscopy focused on an electron state in a 1s orbital of a fluorine atom in a boundary region between the elastic layer and the release layer in a cross-section of the member for electrophotography along a thickness direction.

10. The member for electrophotography according to claim 9, wherein the peak that indicates the bonding state of the fluorine atom is at least 2 eV shifted toward the lower energy than a position of a peak top of the binding energy of the —$CF_2$—$CF_2$— skeleton.

11. The member for electrophotography according to claim 9, wherein when a position of a peak top of the peak of the binding energy of the —$CF_2$—$CF_2$— skeleton is standardized to 688.7 eV, a position of a peak top of the peak that indicates the bonding state of the fluorine atom is at 686.3±0.5 eV.

12. An image heating apparatus comprising a fixing member and a heating member, wherein the fixing member comprises:
a substrate;
an elastic layer comprising a silicone rubber, provided on the substrate; and a release layer comprising a fluorine resin, provided in direct contact with a surface of the elastic layer,
wherein the release layer comprises at least one fluorine resin selected from the group consisting of a tetrafluoroethylene-perfluoro(alkylvinylether) copolymer (PFA), a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVDF), and
wherein the elastic layer undergoes a cohesive failure when the release layer is peeled from the elastic layer in accordance with "Determination of peel strength of bonded assemblie Part 1: 90 degree peel" specified by Japanese Industrial Standards (JIS) K 6854-1:1999.

13. An image forming apparatus comprising an image heating apparatus, the image heating apparatus fixing a toner by heating on a recording medium, thereby forming an image,
wherein the image heating apparatus comprises a fixing member and a heating member, and
wherein the fixing member comprises: a substrate;
an elastic layer comprising a silicone rubber, provided on the substrate; and
a release layer comprising a fluorine resin, provided in direct contact with a surface of the elastic layer,
wherein the release layer comprises at least one fluorine resin selected from the group consisting of a tetrafluoroethylene-perfluoro(alkylvinylether) copolymer (PFA), a tetrafluoroethylene-hexafluoropropylene copolymer (FEP), polytetrafluoroethylene (PTFE), an ethylene-tetrafluoroethylene copolymer (ETFE), polychlorotrifluoroethylene (PCTFE), an ethylene-chlorotrifluoroethylene copolymer (ECTFE), and polyvinylidene fluoride (PVDF), and
wherein the elastic layer undergoes a cohesive failure when the release layer is peeled from the elastic layer in accordance with "Determination of peel strength of bonded assemblies Part 1: 90 degree peel" specified by Japanese Industrial Standards (JIS) K 6854-1:1999.

14. A method for manufacturing the member for electrophotography, the method comprising:
forming an elastic layer including a silicone rubber on a substrate;
laminating a release layer including a fluorine resin selected from the group consisting of a tetrafluoroethylene-perfluoroalkylvinylether copolymer (PFA), a tetrafluoroethylene-hexafluoropropylene copolymer (FEP), a polytetrafluoroethylene (PTFE), an ethylene-tetrafluoroethylene copolymer (ETFE), a polychlorotrifluoroethylene (PCTFE), an ethylene-chlorotrifluoroethylene copolymer (ECTFE), and a polyvinylidene fluoride (PVDF), to be brought into direct contact with a surface of the elastic layer; and
bonding the elastic layer and the release layer, by irradiating the surface of contact between the elastic layer and the release layer with ultraviolet light,
wherein the elastic layer undergoes a cohesive failure when the release layer is peeled from the elastic layer in accordance with "Determination of peel strength of bonded assemblies Part 1: 90 degree peel" specified by Japanese Industrial Standards (JIS) K 6854-1:1999.

* * * * *